(12) United States Patent
Aikawa et al.

(10) Patent No.: US 7,737,824 B2
(45) Date of Patent: Jun. 15, 2010

(54) RADIO FREQUENCY IDENTIFICATION (RFID) TAG, PORTABLE TERMINAL, AND SERVER FOR RFID TAG

(75) Inventors: Makoto Aikawa, Sagamihara (JP); Yutaka Takami, Yokohama (JP); Shinichiro Fukushima, Yokohama (JP); Masumi Moritani, Yokohama (JP); Hashimoto Kazunori, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1201 days.

(21) Appl. No.: 11/318,559

(22) Filed: Dec. 28, 2005

(65) Prior Publication Data

US 2006/0145817 A1 Jul. 6, 2006

(30) Foreign Application Priority Data

Dec. 28, 2004 (JP) ............................. 2004-378762

(51) Int. Cl.
*H04Q 5/22* (2006.01)
(52) U.S. Cl. .................... 340/10.4; 340/10.52; 340/5.8; 705/22
(58) Field of Classification Search ................ 340/10.4, 340/10.52, 5.8; 705/22
See application file for complete search history.

(56) References Cited

U.S. PATENT DOCUMENTS

| | | | | |
|---|---|---|---|---|
| 5,469,363 | A | * | 11/1995 | Saliga ......................... 700/225 |
| 5,963,134 | A | * | 10/1999 | Bowers et al. ........... 340/572.1 |
| 2003/0128124 | A1 | | 7/2003 | Amtmann et al. |
| 2004/0178911 | A1 | * | 9/2004 | Sakamoto et al. ......... 340/572.4 |
| 2006/0087407 | A1 | * | 4/2006 | Stewart et al. ........... 340/10.52 |
| 2006/0145817 | A1 | * | 7/2006 | Aikawa et al. ............. 340/10.3 |
| 2007/0050261 | A1 | * | 3/2007 | Lin ............................. 705/22 |
| 2007/0118549 | A1 | * | 5/2007 | Bornhoevd et al. ......... 707/101 |

FOREIGN PATENT DOCUMENTS

| | | |
|---|---|---|
| EP | 0656599 | 6/1995 |
| WO | 03/077185 | 9/2003 |

OTHER PUBLICATIONS

"All About RFID Tag", Nikkei BP Inc., Mar. 17, 2004.

* cited by examiner

*Primary Examiner*—Daniel Wu
*Assistant Examiner*—Bradley E Thompson
(74) *Attorney, Agent, or Firm*—Antonelli, Terry, Stout & Kraus, LLP.

(57) ABSTRACT

A hierarchical structure is established among a plurality of RFID tags, such that ID numbers can be read only from RFID tags which belong to a particular layer. RFID tag can control whether permission should be given to read its ID number therefrom to protect the ID number. Data held in the RFID tag can be read from the outside. RFID tag comprises a memory circuit having a function of holding data, and a logic circuit having a function of processing a control command received from outside. Memory circuit stores an own ID number for identifying the RFID tag itself, and a parent ID number for identifying a second RFID tag. When RFID tag receives an ID number read command which contains first data as a parameter from outside, the logic circuit outputs the own ID number to outside only when the first data matches the parent ID number.

5 Claims, 8 Drawing Sheets

FIG. 1
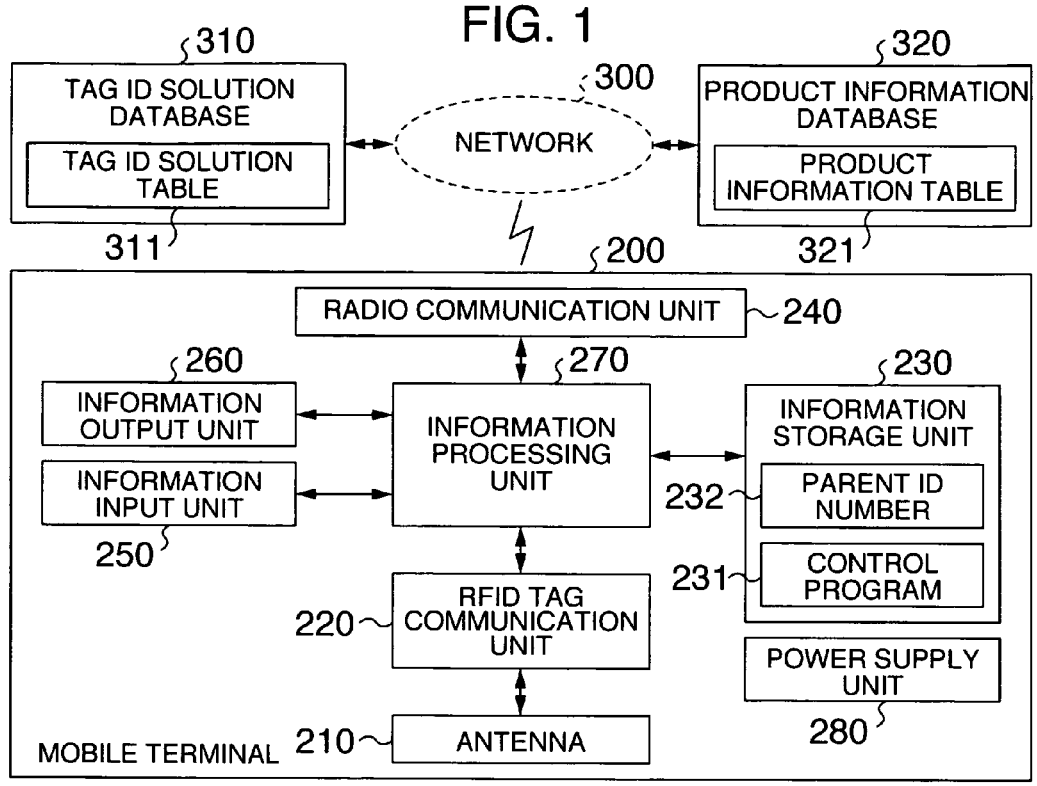
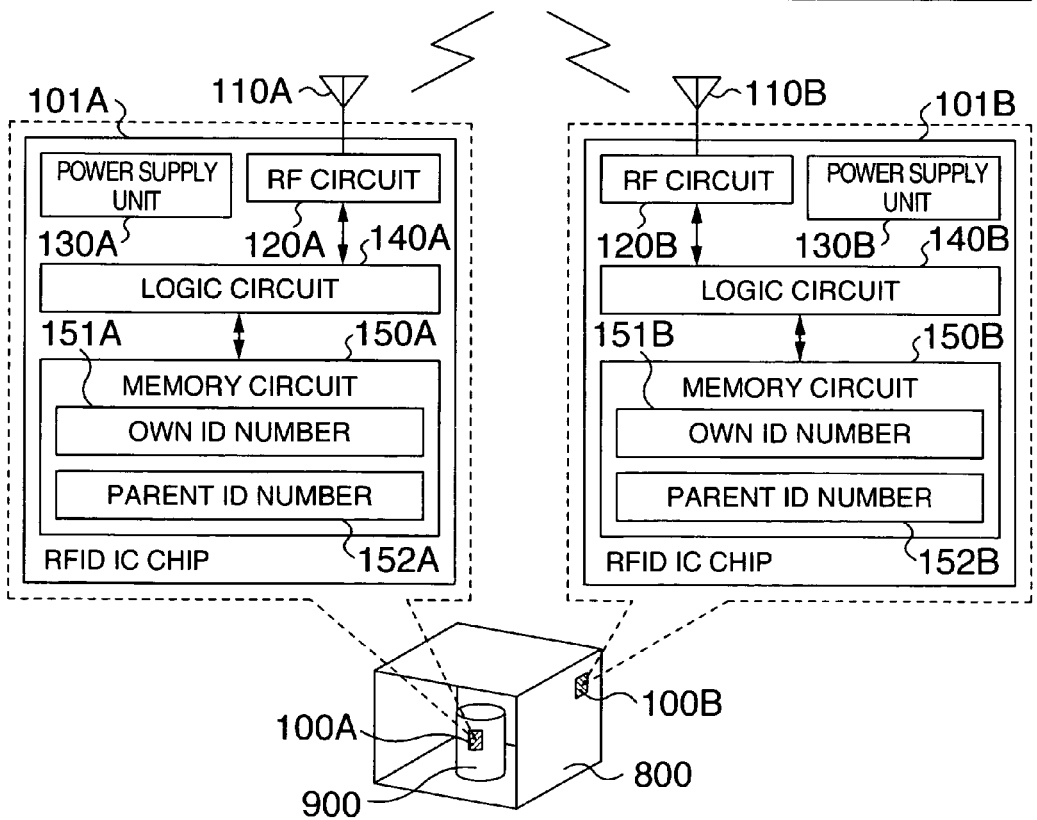

|  | PARENT ID NUMBER | OWN ID NUMBER |
|---|---|---|
| RFID TAG 100A | 0x0000 | 0x1111 |
| RFID TAG 100B | 0x0000 | 0x2222 |
| RFID TAG 100C | 0x1111 | 0x0101 |
| RFID TAG 100D | 0x1111 | 0x0202 |
| RFID TAG 100E | 0x2222 | 0x0303 |
| RFID TAG 100F | 0x2222 | 0x0404 |

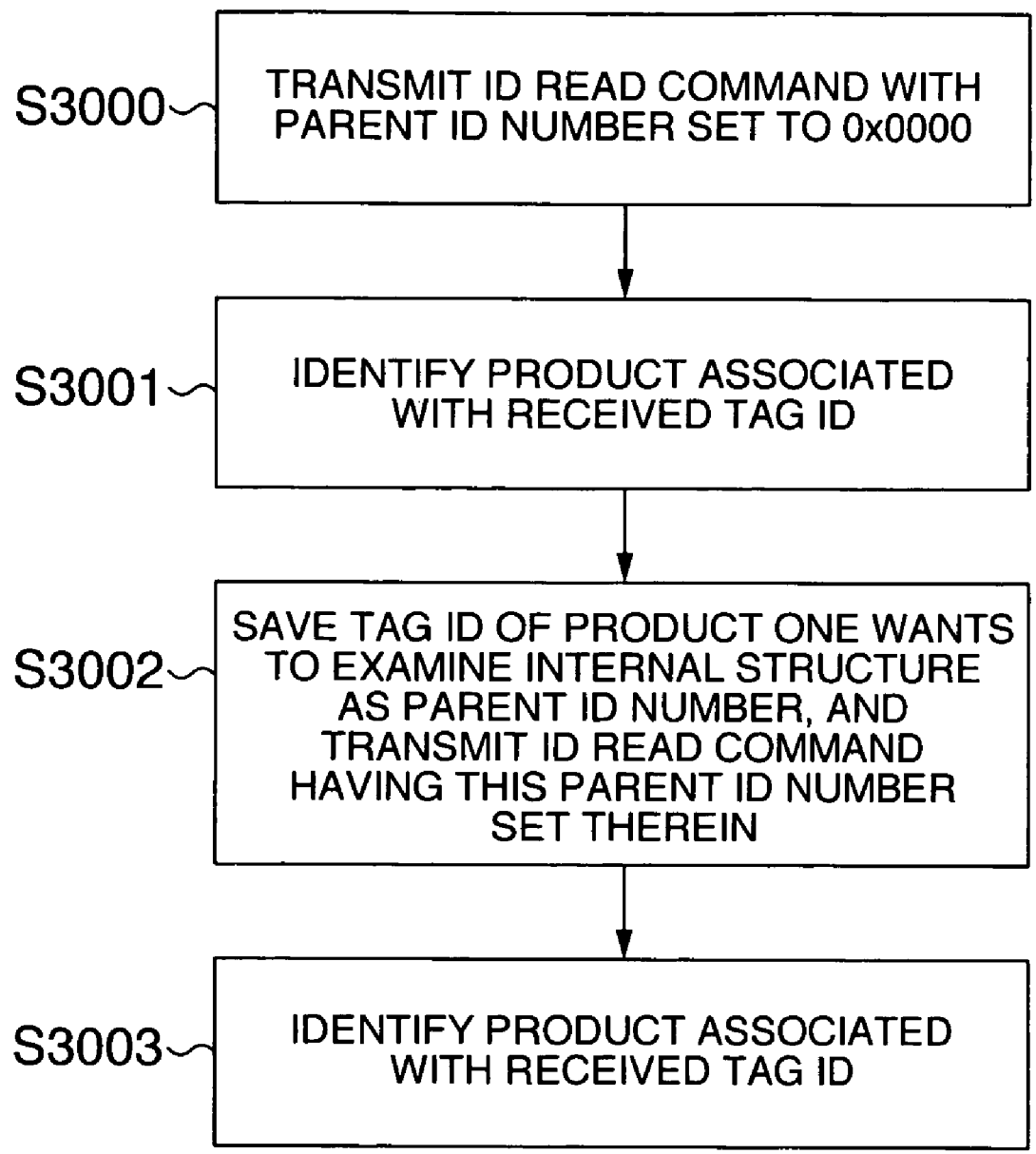

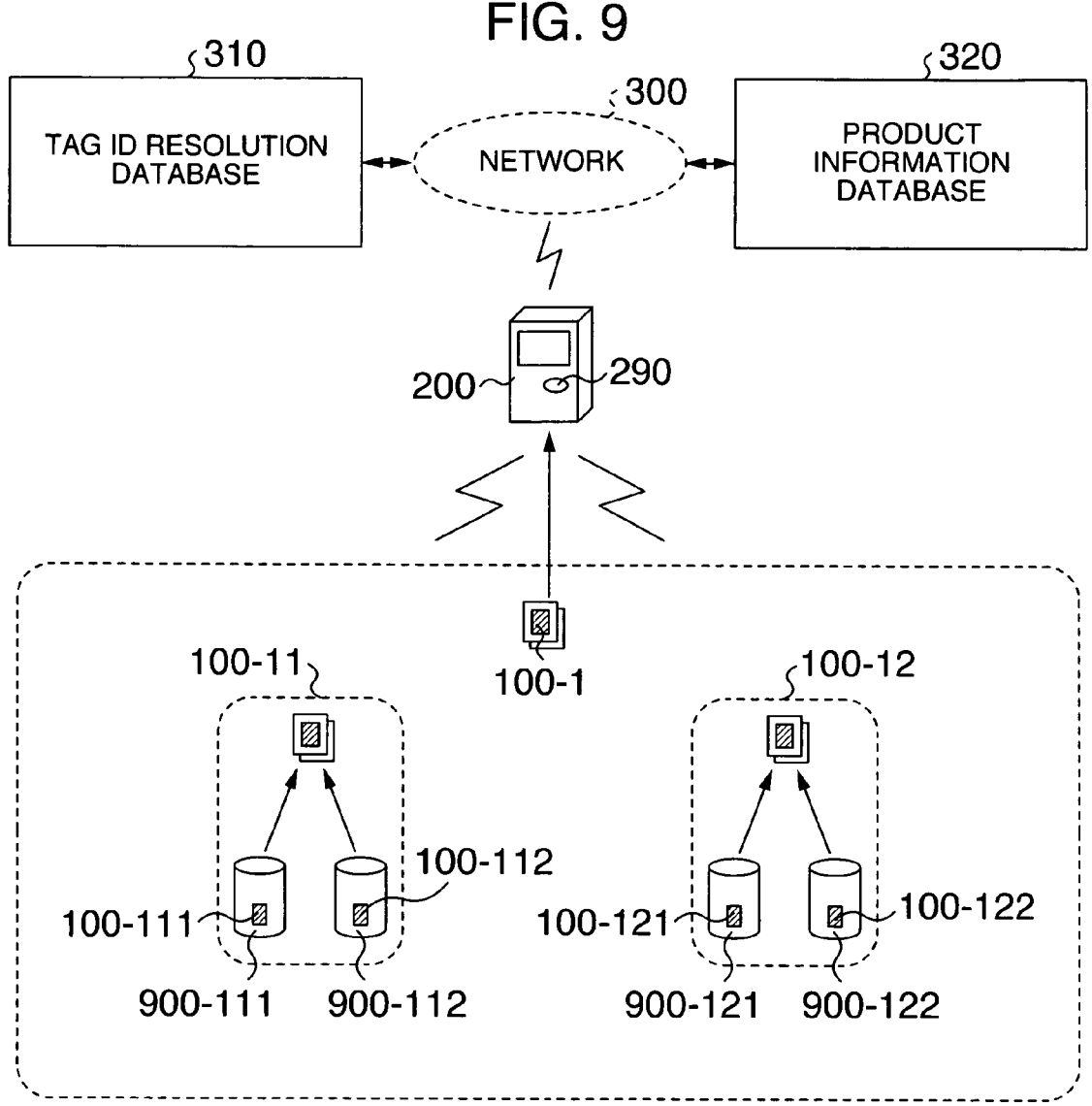

FIG. 10

|  | PARENT ID NUMBER | OWN ID NUMBER | ASSOCIATED INFORMATION |
|---|---|---|---|
| GROUP TAG 100-1 | 0x0000 | 0x1111 | MR. YAMADA'S PROPRIETARIES |
| GROUP TAG 100-11 | 0x1111 | 0x2222 | PROPRIETARIES NOT OPEN TO PUBLIC |
| GROUP TAG 100-12 | 0x1111 | 0x3333 | PROPRIETARIES OPEN TO PUBLIC |
| RFID TAG 100-111 | 0x2222 | 0x0101 | POCKETBOOK |
| RFID TAG 100-112 | 0x2222 | 0x0202 | WALLET |
| RFID TAG 100-121 | 0x3333 | 0x0303 | UMBRELLA |
| RFID TAG 100-122 | 0x3333 | 0x0404 | CAMERA |

FIG. 11

|  | PARENT ID NUMBER | OWN ID NUMBER | ASSOCIATED INFORMATION |
|---|---|---|---|
| MOBILE TERMINAL 200 | 0x4444 | - | - |
| GROUP TAG 100-1 | 0x4444 | 0x1111 | MR. YAMADA'S PROPRIETARIES |
| GROUP TAG 100-11 | 0x1111 | 0x2222 | PROPRIETARIES NOT OPEN TO PUBLIC |
| GROUP TAG 100-12 | 0x1111 | 0x3333 | PROPRIETARIES OPEN TO PUBLIC |
| RFID TAG 100-111 | 0x2222 | 0x0101 | POCKETBOOK |
| RFID TAG 100-112 | 0x2222 | 0x0202 | WALLET |
| RFID TAG 100-121 | 0x3333 | 0x0303 | UMBRELLA |
| RFID TAG 100-122 | 0x3333 | 0x0404 | CAMERA |

US 7,737,824 B2

RADIO FREQUENCY IDENTIFICATION (RFID) TAG, PORTABLE TERMINAL, AND SERVER FOR RFID TAG

INCORPORATION BY REFERENCE

The present application claims priority from Japanese application JP2004-378762 filed on Dec. 28, 2004, the content of which is hereby incorporated by reference into this application.

BACKGROUND OF THE INVENTION

The present invention relates to a radio frequency identification (RFID) tag which comprises an radio communication IC chip, and an information system using the RFID tag.

In recent years, the RFID tag has drawn attention as a technology for identifying a variety of "objects". The RFID tag is a module comprised of a very small radio communication IC chip and an antenna, and can be designed in a variety of shapes such as a card shape, a label shape and the like. The radio communication IC tip of the RFID tag has a built-in memory from which data can be read in a non-contact manner using a dedicated reader (hereinafter called the "tag reader"). There is also an RFID tag which can write data into a built-in memory in a non-contact manner using a dedicated writer. Further, some tag readers and RFID tags may comprise a mechanism for avoiding collisions of communications (anti-collision function) which can result from simultaneous responses made by a plurality of RFID tags (see, "All about RFID IC Tag", Nikkei BP Inc., Mar. 17, 2004).

The anti-collision function enables a tag reader to collectively read information from a plurality of RFID tags. An ID number for identifying an article (hereinafter called the "tag ID") can be stored in an RFID tag which has such a feature, such that the RFID tag can be attached to the associated article to permit an efficient article management).

SUMMARY OF THE INVENTION

However, supposing the widespread proliferation of the RFID tags and tag readers which have the anti-collision function in the future, if ID numbers of such RFID tags are collectively read using a tag reader, the tag reader can read unnecessary ID numbers from unintended RFID tags. For example, when one wishes to identify the ID number of an RFID tag attached to an object placed in his bag, he/she may read ID numbers of RFID tags attached to objects outside the bag. In this event, great difficulties will be experienced in finding which RFID tag is attached to the object placed in the bag, possibly degrading the convenience of the RFID tag. Also, if tag readers are incorporated in mobile terminals such as mobile telephones so that a large number of persons carry the mobile terminal together with the tag readers, the ID number of a certain RFID tag attached to a personal effect of a person can be read by other persons without permission. In this event, a problem will be the leak of information related to the privacy, such as which type of objects a certain person owns.

The present invention has been made in view of the problem mentioned above, and it is an object of the invention to provide an RFID tag which is placed in a hierarchical structure established among a plurality of the RFID tags, such that ID numbers can be read only from those RFID tags which belong to a particular layer, and is capable of controlling whether permission should be given to read its ID number to protect the ID number. The present invention also provides an information system using the RFID tags.

To achieve the above object, an RFID tag according to the present invention holds data which can be read from the outside over the air. The RFID tag includes a memory circuit for holding data, and a logic circuit for processing a control command received from the outside over the air, wherein the memory circuit stores an own ID number for identifying the RFID tag itself, and one or more parent ID numbers for identifying other RFID tags, and when the RFID tag receives an ID number read command which contains first data as a parameter from the outside, the logic circuit outputs the own ID number to the outside over the air only when the first data matches the parent ID number.

Also, a mobile terminal according to the present invention is capable of reading and writing data held by an RFID tag over the air. The mobile terminal includes an RFID tag communication unit for communicating with the RFID tag over the air, an information storage unit for storing data and a control program, an radio communication unit having a function of communicating with a wide area communication network over the air, and an information processing unit for controlling the mobile terminal in accordance with the control program, wherein the control program causes the RFID tag communication unit to transmit an ID number read command containing an ID number of a known RFID tag as a parameter, and causes the RFID tag communication unit to receive an ID number of an unknown RFID tag as a response to the ID number read command.

Further, an RFID tag server according to the present invention is connected to a mobile terminal through a network for searching for information on an RFID tag which holds data that can be read by the mobile terminal from the outside over the air, wherein the RFID tag stores an own ID number for identifying the RFID tag itself, and one or more parent ID numbers for identifying other RFID tags in a memory circuit, and upon receipt of an ID number read command containing first data as a parameter from the mobile terminal, outputs the own ID number to the outside over the air only when the first data matches the parent ID number, and the RFID tag server comprises a database for storing information associated with the tag ID, and searches the database for information associated with the tag ID upon receipt of the tag ID read from the RFID tag by the mobile terminal through the network.

Accordingly, the present invention can provide a RFID tag which can protect the ID number of the RFID tag, and an information system which uses the RFID tag.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram illustrating the configuration of an RFID tag system according to a first embodiment;

FIG. 8 is a flow diagram illustrating a sequence of processing executed by a mobile terminal 200 when it reads a tag ID of each RFID tag;

FIG. 9 is a diagram illustrating the configuration of an RFID tag system according to a second embodiment;

FIG. 10 is a table (No. 1) showing a list of a parent ID number and an own ID number of each RFID tag; and FIG. 11 is a table (No. 2) showing a list of a parent ID number and an own ID number of each RFID tag.

DESCRIPTION OF THE EMBODIMENTS

Figure 2:
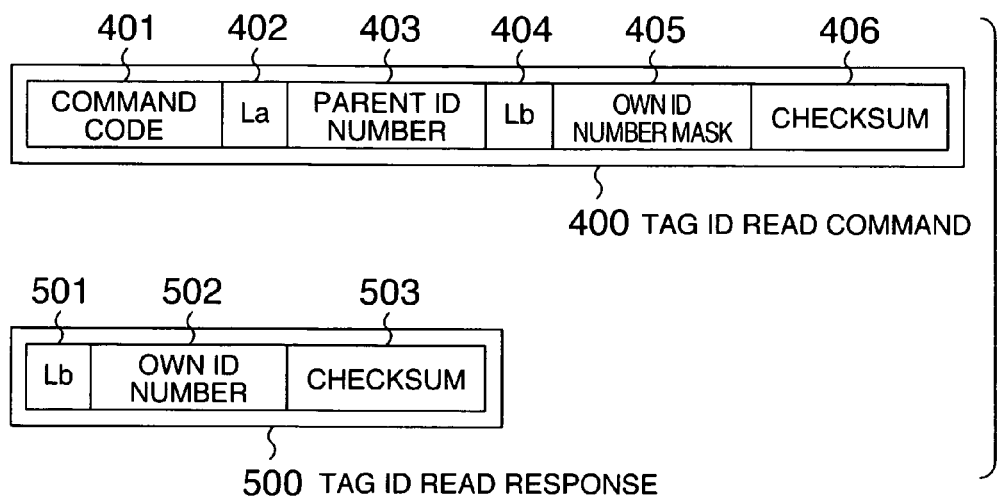
FIG. 2 shows a control command and a response which are used to read a tag ID.

In the following, embodiments of the present invention will be described with reference to the accompanying drawings.

To begin with, a first embodiment will be described. FIG. 1 is a block diagram illustrating components of an RFID tag system according to the first embodiment. In FIG. 1, the RFID tag system comprises RFID tags 100A, 100B, a mobile terminal 200, a network 300, a tag ID solution database 310, and a product information database 320. Each of the RFID tags 100A, 100B has a function of reading and writing a tag ID stored therein using radio communications, and is attached to an associated product.

In FIG. 1, the RFID tag 100A is attached to a product 900, while the RFID tag 100B is attached to a container 800. The container 800 represents a bock, a shelf or the like which can accommodate the product 900. Alternatively, the container 800 may not be a physical entity but may represent a logical set that has the product 900 as an element, such as a group to which the product 900 belongs, within the scope of the present invention. Also, the RFID tags may use any frequency band within the scope of the present invention.

The mobile terminal 200 has a function of reading and writing a tag ID from and into an RFID tag, and also has a function of inquiring of a variety of databases as to a tag ID read from an RFID tag through a network, and may be implemented, for example, by a PDA, a mobile telephone, or a personal computer.

The network 300 is a wide area communication network which can be accessed over the air or through a line, and may be implemented, for example, by the Internet or a mobile communication network for mobile telephones.

The tag ID solution database 310 has a function of searching a tag ID solution table 311 for the address (for example, URL or the like) of a database which stores information on an associated product from a tag ID read from an RFID tag. The product information database 310 has a function of searching a product information table 321 for information on a product associated with a tag ID read from an RFID tag.

The tag ID solution database can form part of a server for ID solution.

Next, the RFID tag 100A will be described in greater detail. The RFID tag 100A comprises an RF IC chip 101A and an antenna 110A. The RF IC chip 101A is a semiconductor module which can be accessed over the air for data stored therein, and comprises an RF circuit 120A, a power supply unit 130A, a logic circuit 140A, and a memory circuit 150A. While the antenna 110A can be externally attached to the RFID IC chip 101A or built in the RFID IC chip 101A, any implementation is within the scope of the present invention. The RF circuit 120A demodulates a high-frequency signal received by the antenna 110A to reproduce a digital signal or modulates a digital signal for radio transmission. Here, any frequency band and modulation/demodulation method may be used by the RF circuit 120A within the scope of the present invention.

The power supply unit 130A generates the power for driving the RF IC chip 101A from a high-frequency signal received by the antenna 110A. The logic circuit 140A demodulates a control command from a digital signal received by the RF circuit 120A to conduct a control in accordance with the control command. The logic circuit 140A also encodes the result of the control into a digital signal which is outputted to the RF circuit 120A. The memory circuit 150A has a non-volatile storage area, and comprises, for example, a semiconductor memory such as EEPROM.

The memory circuit 150A provides the logic circuit 140A with a data read/write function. The memory circuit 150A stores an own ID number 151A and a parent ID number 152A. The own ID number 151A represents a tag ID associated with a product 900A to which the RFID tag 100A is attached. The parent ID number 152A represents a tag ID associated with the container 800 which stores the product 900A, and is used to identify an aggregate to which the own ID number 151A belongs.

The RFID tag 100B which is attached to the container 800 has the same internal configuration as the RFID tag 100A, but when the container 800 is stored in a higher-rank container, a tag ID associated with the higher-rank container is stored in the memory circuit 150B as a parent ID number 152B. In another case, when the container 800 is the highest-rank container, a special number is stored in the memory circuit 150B as the parent ID number 152B. For example, the container 800 may be identified to be the highest-rank container by setting zero to all the digits of the parent ID number.

Next, the mobile terminal 200 will be described in greater detail. The mobile terminal 200 comprises an antenna 210, an RFID tag communication unit 220, an information storage unit 230, an radio communication unit 240, an information input unit 250, an information output unit 260, an information processing unit 270, and a power supply unit 280. The antenna 210 is used to make communications with RFID tags over the air.

The RFID tag communication unit 220 modulates a digital signal for controlling an RFID tag, and outputs the modulated signal through the antenna 210. In addition, the RFID tag communication unit 220 demodulates a high-frequency signal received by the antenna 210 to extract a digital signal. Here, any frequency band and modulation/demodulation method may be used by the RFID tag communication unit 220 within the scope of the present invention.

The information storage unit 230 has a function of temporarily or permanently storing a program and data processed by the information processing unit 270, and may comprise, for example, a semiconductor memory such as ROM (Read Only Memory), RAM (Random Access Memory), flash memory or the like. The radio communication unit 240 has a function of connecting to the network 300 over the air, and may use radio communications for wireless LAN and mobile telephone, by way of example. Here, the mobile telephone 200 may be connected to the network 3300 through a line within the scope of the present invention.

The information input unit 250 provides the user with a function of operating the mobile terminal 200, and may comprise, for example, a numeral key pad, cursor buttons, a liquid crystal display with a touch sensor. The information output unit 260 provides a function of displaying the result of information processing executed by the mobile terminal 200 to the user, and may comprise, for example, a liquid crystal display or the like. The information processing unit 270, which is based on a microprocessor or the like, executes a control program 231 stored in the information storage unit 230 to govern the control over the entire mobile terminal 200. The power supply unit 280 supplies the power for operating the mobile terminal 200.

Next, a control command and a response, used by the mobile terminal 200 for reading the tag ID's of the RFID tags 100A and 100B, will be described with reference to FIGS. 2. In FIG. 2, a tag ID read command is generally designated by 400, and a tag ID read response by 500. The tag ID read command 400 is a command transmitted by the mobile terminal 200 when it acquires tag ID's of RFID tags located around the mobile terminal 200, and is received by all RFID tags which are located around the mobile terminal 200. The tag ID read response 500, in turn, is returned by only an RFID tag that satisfies response conditions, among the RFID tags which have received the tag ID read command 400.

Fields which make up the tag ID read command 400 include a command code field 401, an La field 402, a parent ID number field 403, an Lb field 404, an own ID number mask field 405, and a check sum field 406. The command code field 401 stores a code for identifying the type of the command. The La field 402 indicates the length of the parent ID number field 403. The parent ID number field 403 stores a parent ID number. The Lb field 404 indicates the length of the own ID number mask field 405. The own ID number mask field 405 stores part of an own ID number. The check sum field 406 stores a code for checking a command for possible errors upon reception. For example, a CRC code may be stored in the check sum field 406. Alternatively, another error check code may be used within the scope of the present invention.

Fields which make up the tag ID read response 500 include an Lc field 501, an own ID number field 502, and a check sum field 503. The Lc field 501 stores the length of the own ID number field 502. The own ID number field 502 stores the own ID number of an RFID tag which has responded. The check sum field 503 stores a code for checking a response for possible errors upon reception. For example, a CRC code may be stored in the check sum field 503. Alternatively, another error check code may be used within the scope of the present invention.

Figure 3:
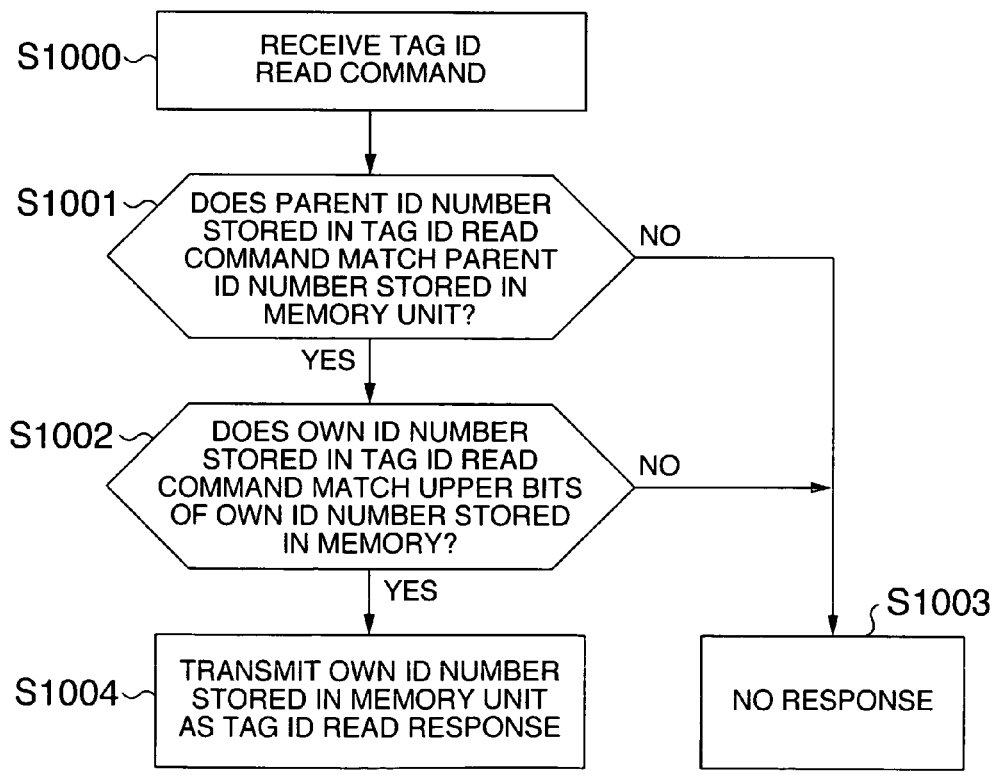
FIG. 3 is a flow diagram illustrating a sequence of processing executed by an RFID tag 100A which has received a tag ID read command 400.

Next, FIG. 3 illustrates a processing flow of the RFID tag 100A which has received the tag ID read command 400. In FIG. 3, first, upon receipt of the tag ID read command 400 at step S1000, the RFID tag 100A checks at step S1001 whether or not the value of a parent ID number stored in the parent ID number field 403 of the tag ID read command 400 matches the parent ID number 152A stored in the memory circuit 150A. If they do not match, the RFID tag 100A terminates the processing flow at step S1003 without returning a response (no response). On the other hand, if they match, the RFID tag 100A checks at step S1002 whether or not the own ID number stored in the own ID number mask field 405 of the tag ID read command 400 matches upper bits of the own ID number 151A stored in the memory circuit 150A. Assume, for example, that the own ID number has a length of 16 bits, and the own ID number 151A is "1111 0101 0000 1010" in binary notation.

In this event, when the own ID number mask field 405 stores "1111" in binary notation, the check at step S1002 is successful because the upper four bits of the own ID number 151A match the value stored in the own ID number mask field 405. On the other hand, when the own ID number mask field 405 stores "1010" in binary notation, the check at step S1002 fails because the upper four bits of the own ID number 151A do not match the value stored in the own ID number mask field 405. If the check fails at step S1002, the RFID tag 100A terminates the processing flow at step S1003 without returning a response (no response). Conversely, if the check is successful at step S1002, the RFID tag 100A returns the tag ID read response 500 which contains the own ID number 151A stored in the memory circuit 150A in the own ID number field 502 at step S1004.

In the tag ID read process described above, executed by the RFID tag, the RFID tag can be prevented from responding if the parent ID number stored therein does not match the parent ID number contained in the tag ID read command 400, with the execution of step S1001. Also, with the execution of step S1002, the RFID tag can implement an anti-collision function for avoiding a collision resulting from simultaneous responses made by a plurality of RFID tags when there are a plurality of RFID tags, the parent ID number of which matches the parent ID number contained in the tag ID read command 400, as determined at step S1001.

For example, the mobile terminal 200 may first transmit the tag ID read command 400 without the own ID number mask field 405 (the Lb field is set to zero). If a plurality of RFID tags respond to the command 400 to cause a collision, the mobile terminal 200 may next transmit the tag ID read command 400 which contains 1-bit data "0" stored in the own ID number mask field 405. If a collision occurs again, the mobile terminal 200 may again transmit the tag ID read command 400 which contains 2-bit data "00" stored in the own ID number mask field 405. In this way, the mobile terminal 200 may change the number of bits and the value stored in the own ID number mask field 405 until a collision no longer occurs. Here, as long as the parent ID number field is defined in the tag ID read command 400 such that a response can be made only by an RFID tag, the parent ID number of which matches the value stored in the parent ID number field, an anti-collision mechanism different from the foregoing method may be used within the scope of the present invention.

Next, a control command and a response, used by the mobile telephone 200 for updating the tag ID's of the RFID tags 100A and 100B, will be described with reference to FIG. 4.

Figure 4:
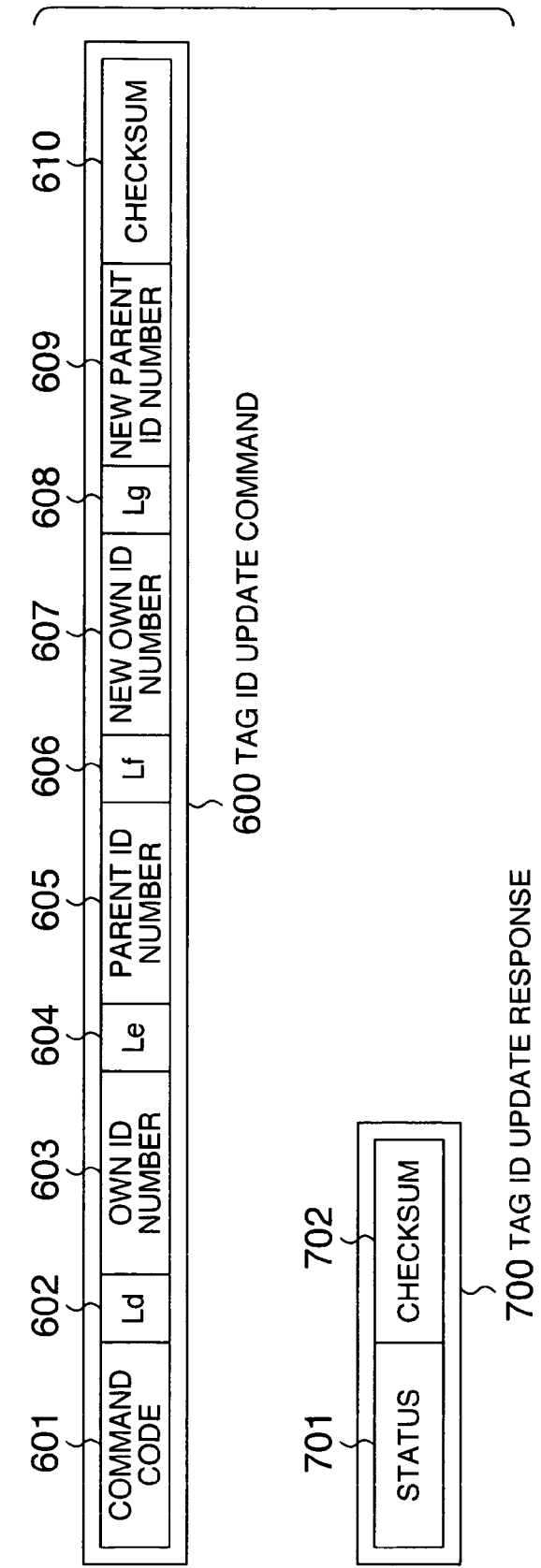
FIG. 4 shows a control command and a response which are used to update a tag ID.

In FIG. 4, a tag ID update command is generally designated by 600, and a tag ID update response by 700. Fields which make up the tag ID update command 600 include a command code field 601, an Ld field 602, an own ID number field 603, an Le field 604, a parent ID number field 605, an Lf field 606, and a new own ID number field 607, an Lg field 608, and a new ID number field 609, and a check sum field 610.

The command code field 610 stores a code for identifying the type of the command. The Ld field 602 indicates the length of the own ID number field. The own ID number field 603 stores a current own ID number of an RFID tag to which the command is to be transmitted. The Le field 604 indicates the length of the parent ID number field 605. The parent ID number field 605 stores a current parent ID number field of the RFID tag to which the command is to be transmitted. The Lf field 606 indicates the length of the new own ID number field 607. The new own ID number field 607 stores an updated own ID number. The Lg field 608 indicates the length of the new parent ID number field 609. The new parent ID number field 609 stores an updated parent ID number. The check sum field 610 stores a code for checking the command for possible errors upon reception.

Field which make up the tag ID update response 700 include a status field 701 and a check sum field 702. The status field 701 indicates whether or not the tag ID has been successfully updated. The check sum field 702 stores a code for checking the response for possible errors upon reception.

Figure 5:
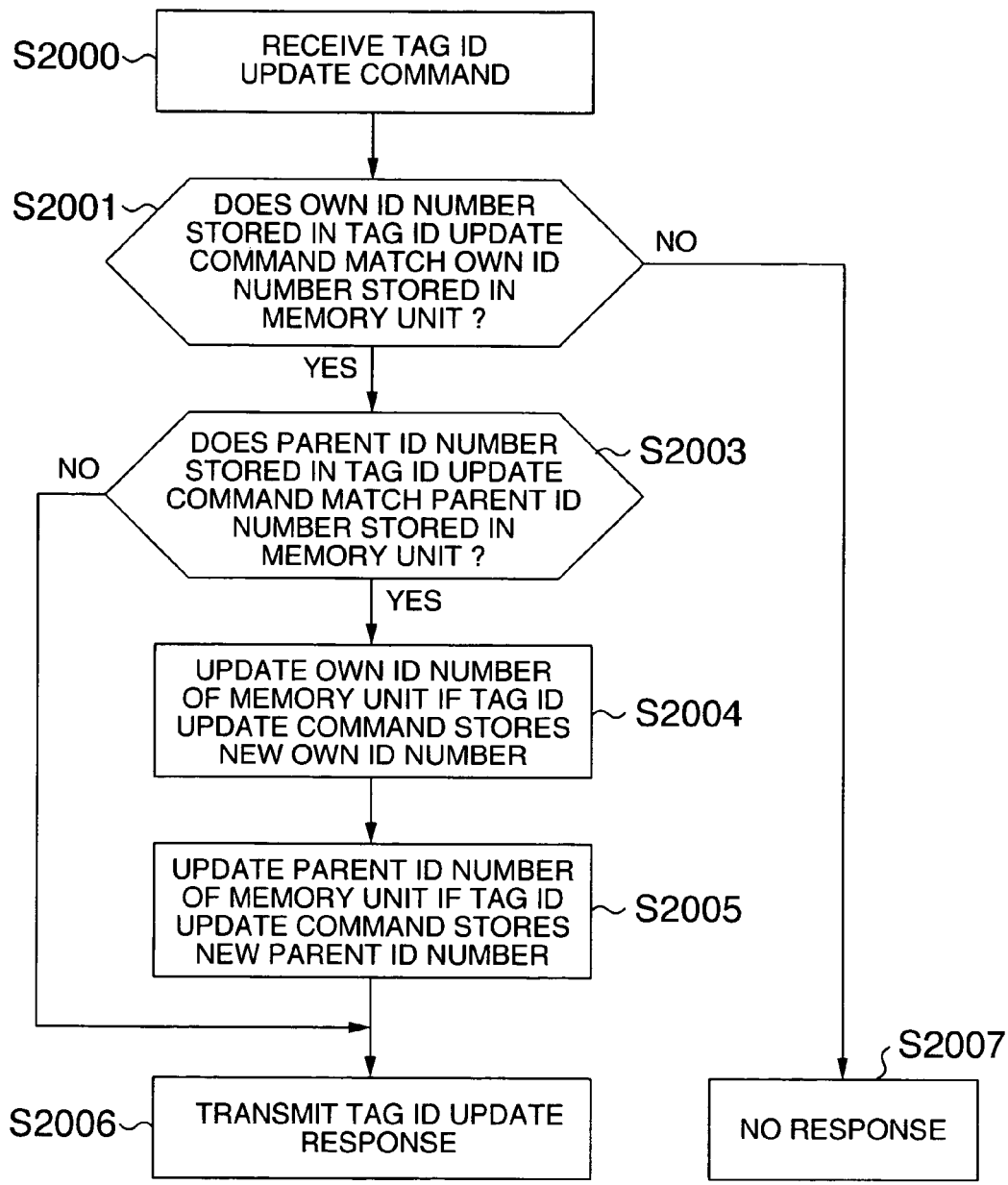
FIG. 5 is a flow diagram illustrating a sequence of processing executed by the RFID tag 100A which has received a tag ID update command 400.

Next, FIG. 5 illustrates a processing flow of the RFID tag 100A when it has received the tag ID update command. In FIG. 5, first, upon receipt of the tag ID update command 600 at step S2000, the RFID tag 100A checks whether or not an own ID number stored in the own ID number field 603 of the tag ID update command 600 matches the own ID number 151A stored in the memory circuit 150A. If they do not match, the RFID tag 100A terminates the processing flow at step S2007 without returning a response (no response). If they match, the RFID tag 100A next checks at step S2003 whether or not a parent ID number stored in the parent ID number field 605 of the tag ID update command 600 matches the parent ID number 152A stored in the memory circuit 150A.

If they do not match, the RFID tag 100A transmits the tag ID update response 700 which contains data indicative of a failed update, set in the status field 701, at step S2006. Conversely, if they match, the RFID tag 100A rewrites the value of the own ID number 151A stored in the memory circuit 150A to a value stored in the new own ID number field 607 at step S2004, provided that the Lf field 606 contains a value other than zero, indicating that the new own ID number field 607 stores the value. Next, at step S2005, if the Lg field 608 contains a value other than zero, indicating that the new parent ID number field 609 stores a value, the RFID tag 100A rewrites the value of the parent ID number 152A stored in the memory circuit 150A to the value stored in the new parent ID number field 609. Next, at step S2006, the RFID tag 100A sets data indicative of a successful update in the status field 701, and transmits the resulting tag ID update response 700.

In the tag ID update process described above, executed by the RFID tag, the RFID tag can be prevented from updating the tag ID if the current parent ID number stored therein does not match the parent ID number contained in the tag ID update command 600, with the execution of step S2003. Thus, the RFID tag cannot update the tag ID unless it knows the current parent ID number, so that the tag ID can be updated without permission with lower possibility to improve the security.

Figures 6, 7:
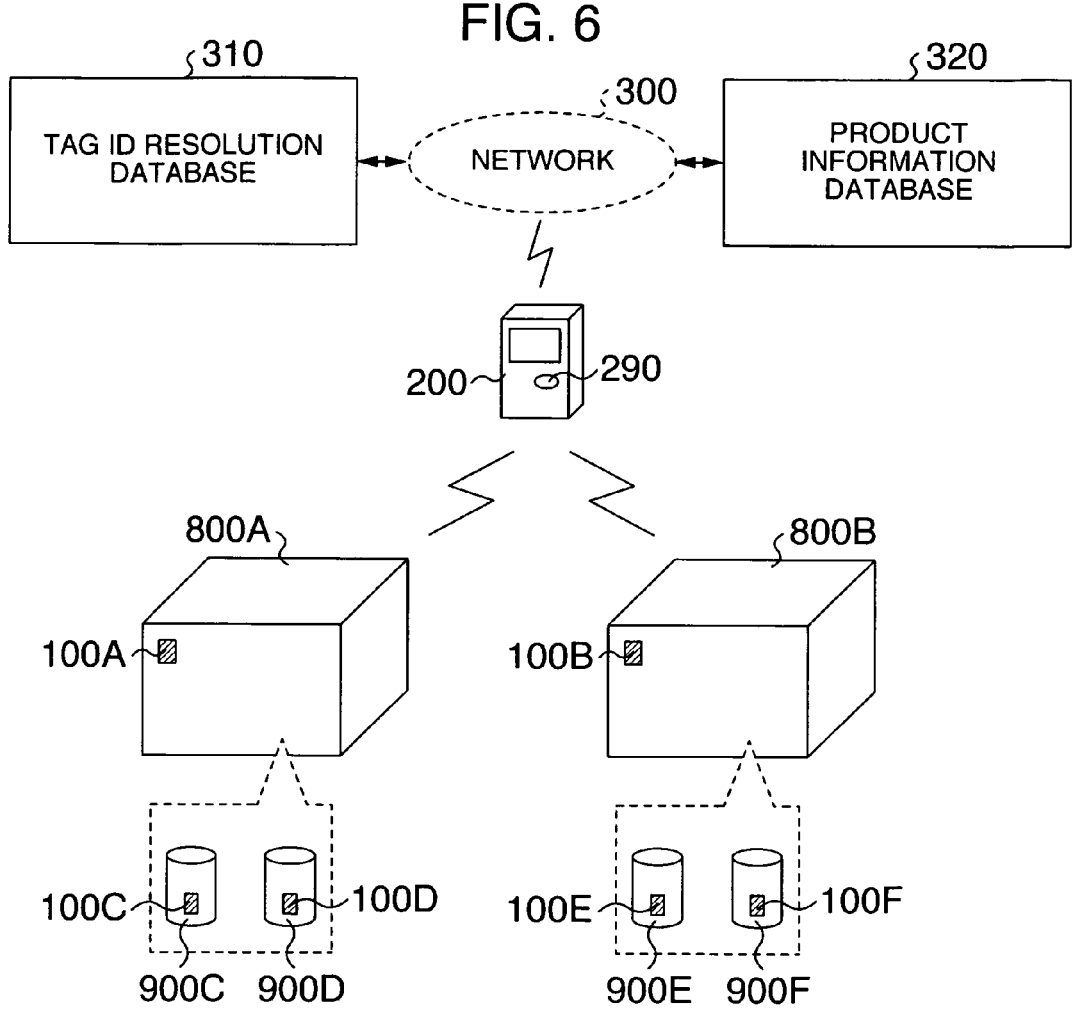
FIG. 6 is a diagram illustrating the configuration of the RFID tag system according to the first embodiment.
FIG. 7 is a table showing a list of a parent ID number and an own ID number of each RFID tag.

Next, for describing the operation of the mobile terminal 200, FIG. 6 illustrates an exemplary configuration of a RFID tag system related to this embodiment. In FIG. 6, a product 900C to which an RFID tag 100C is attached, and a product 900D to which an RFID tag 100D is attached are stored in a container 800A. The RFID tag 100A is attached to the container 800A. Also, a product 900E to which an RFID tag 100E is attached, and a product 900F to which an RFID tag 100F is attached are stored in a container 800B. The mobile terminal 200 reads these RFID tags for attempting to recognize in which container each product is stored. Here, the mobile terminal 200 comprises an RFID tag read button 290 which, when depressed by the user, triggers an RFID tag read process.

While the RFID tags 100A, 100B, 100C, 100D, 100E, 100F have the same configuration as the RFID tag described in connection with FIG. 1, they differ from one another in the own ID number and parent ID number. FIG. 7 shows a table which lists the correspondence between the own ID numbers and parent ID numbers assigned to the RFID tags 10A, 100B, 100C, 100D, 100E, 100F. Here, while both the own ID number and parent ID number are assumed to have a length of two bytes (16 bits) in the following description, the present invention can be applied irrespective of the lengths of the respective ID numbers.

In FIG. 7, the RFID tags 100A, 100B store a parent ID number equal to "0x0000". Assume that this means that no parent ID number is assigned to the RFID tags 100A, 100B. The RFID tags 100C, 100D store a parent ID number equal to the own ID number of the RFID tag 10A. In this way, an association can be established in that the product 900C to which the RFID tag 100C is attached, and the product 900D to which the RFID tag 100D is attached are components of the container 800A to which the RFID tag 100A is attached. On the other hand, the RFID tags 100E, 100F store a parent ID number equal to the own ID number of the RFID tag 100B. In this way, an association can be established in that the product 900E to which the RFID tag 100E is attached, and the product 900F to which the RFID tag 100F is attached are components of the container 800B to which the RFID tag 100B is attached.

Next, a processing flow executed by the mobile terminal 200 for reading the tag ID of each RFID tag will be described with reference to FIG. 8. In FIG. 8, as the RFID tag read button 290 is depressed, the mobile terminal 200 first transmits a tag ID read command 400 which contains the parent ID number set to 0x0000. As a result, the RFID tags 100A, 100B respond to the command 400, and the mobile terminal 200 acquires their respective own ID numbers as tag ID's. Here, the RFID tags 100C, 100D, 100E, 100F do not respond because they have parent ID numbers different from that specified by the tag ID read command 400.

Next, at step S3001, the mobile terminal 200 inquires of the tag ID solution database 310 and product information database 320 as to information on products associated with the tag ID's received thereby, and recognizes that the RFID tag 100A is attached to the container 800A, and the RFID tag 100B is attached to the container 800B. Next, at step S3002, for examining products stored in the container 800A, the mobile terminal 200 sets the tag ID of the RFID tag 100A attached to the container 800A in the parent ID number of a tag ID read command ID, and transmits the tag ID read command 400. As a result, the RFID tags 100C, 100D respond to the command 400, and the mobile terminal 200 acquires their respective own ID numbers as tag ID's. Here, the RFID tags 100A, 100B, 100E, 100F do not respond because they have parent ID numbers different from that specified by the tag ID read command 400.

Next, at step S3003, the mobile terminal 200 inquires of the tag ID solution database 310 and product information database 320 as to information on products associated with the tag ID's received thereby, and the mobile terminal 200 recognizes that the RFID tag 100C is attached to the product 900C, and the RFID tag 100D is attached to the product 900D, and also recognizes that the products 900C, 900D are stored in the container 800A. By repeating steps S3002, S3003 in a similar manner, the mobile terminal 200 can recognize that the products 900E, 900F are stored in the container 800B.

By the method described above, a hierarchical structure can be established among the RFID tags, so that the mobile terminal 200 can read only tag ID's of those RFID tags which belong to a particular layer, rather than collectively reading the tag ID's of RFID tags located around the mobile terminal 200. In this way, the mobile terminal 200 can acquire a particular RFID tag, and information on a product associated with this RFID tag, without reading information on unnecessary RFID tags. Since the mobile terminal 200 does not read information on unnecessary RFID tags, the mobile terminal 200 does not inquire of the databases as to information on unnecessary products, thus expecting an increase in the speed of processing and improving the usability for the user.

Also, in the present invention, the mobile terminal 200 is provided with the RFID tag read button 290, such that the RFID tag read process is triggered by a depression onto the RFID tag read button 290. While the RFID tag read process consumes the power as required, the mobile terminal 200 will not perform the tag ID read process for nothing as long as the RFID tag read button 290 is not depressed. This can limit the power consumption caused by the tag ID read process. When the mobile terminal 200 is implemented in a mobile telephone, the foregoing process is presumably important because a reduction in power consumption is essential for the mobile telephone.

Also, when the mobile terminal 200 is implemented in a mobile telephone, the network 300 is a mobile communication network for the mobile telephone. In this situation, the mobile telephone transmits radiowaves to a base station connected to the mobile communication network using the radio communication unit 240 on a periodic basis to confirm an incoming call and the like. In the present invention, on the other hand, the mobile terminal 200, which is a mobile terminal, generates radiowaves for communicating with RFID tags using the RFID tag communication unit 220. If radiowaves transmitted to the base station are generated simultaneously with the radiowaves transmitted to RFID tags, an interference can occur depending on the frequencies of the respective radiowaves, resulting in a failure in the transmission to the base station or the communication with RFID tags. To avoid this problem, in the present invention, the mobile terminal 20 controls the RFID tag communication unit 220 to wait without transmitting radiowaves while the radio communication unit 240 is transmitting radiowaves, and to transmit radiowaves after the radio communication unit 240 has transmitted radiowaves.

Next, a second embodiment will be described. FIG. 9 illustrates the configuration of an RFID tag system according to the second embodiment. In FIG. 9, the RFID tag system comprises group tags 100-1, 100-11, 100-12; RFID tags 100-111, 100-112, 100-121, 100-122; a mobile terminal 200; a network 300; a tag ID solution database 310; and a product information database 320. The group tags 100-1, 100-11, 100-12 are RFID tags for identifying logical sets. For example, they indicate such sets as "Mr. Yamada's proprietaries" or "proprietaries which an owner does not want others to know that he owns." The group tags 100-1, 100-11, 100-12 have the same internal configuration as the RFID tag 100A. The RFID tags 100-111, 100-112, 100-121, 100-122 are RFID tags attached to products.

In FIG. 9, the RFID tag 100-111 is attached to a product 900-111; the RFID tag 100-112 to a product 900-112; the RFID tag 100-121 to a product 900-121; and the RFID tag 100-122 to a product 900-122. The RFID tags 100-111, 100-112, 100-121, 100-122 have the same internal configuration as the RFID tag 100A described in the first embodiment. The mobile terminal 200, network 300, tag ID solution database 310, and product information database 320 have the same functions as those described in the first embodiment. Here, the group tags 100-1, 100-11, 100-12 may be, for example, in a card shape. Otherwise, the group tags may be in any other shape within the scope of the present invention.

Next, FIG. 10 shows a list of a parent ID number and an own ID number stored in each of the group tags and RFID tags, and information associated with tag ID's. Here, while both the own ID number and parent ID number are assumed to have a length of two bytes (16 bits) in the following description, the present invention can be applied irrespective of the lengths of the respective ID numbers. Also, the information associated with the tag ID's is managed using the tag ID solution database 310 and product information database 320 which is connected to the network 300.

In FIG. 10, the group tag 100-1 stores a parent ID number equal to "0x0000." This means that no parent ID number is set in the group tag 100-1 and that the group tag 100-1 is positioned in the highest layer. Information associated with the group tag 100-1 indicates "Mr. Yamada's proprietary," meaning that RFID tags located in lower layers, which can be referenced with the group tag 100-1 positioned at a base point, are all attached to Mr. Yamada's proprietaries.

Next, the group tag 100-11 stores a parent ID number equal to the own ID number of the group tag 100-1. Also, information associated with the group tag 100-11 indicates "proprietaries not open to the public," meaning that RFID tags located in lower layers, which can be referenced with the group tag 100-11 positioned at a base point, are all attached to Mr. Yamada's proprietaries which should not be open to the public. Next, the tag group 100-12 stores a parent ID number equal to the own ID number of the group tag 100-1. Also, information associated with the group tag 100-12 indicates "proprietaries open to the public," meaning that RFID tags located in lower layers, which can be referenced with the group tag 100-12 positioned at a base point, are all attached to Mr. Yamada's proprietaries which may be open to the public.

Next, the RFID tag 100-111 stores a parent ID number equal to the own ID number of the group tag 100-11. Also, information associated with the RFID tag 100-111 indicates a "pocketbook" so that this pocketbook is one of Mr. Yamada's proprietaries not open to the public. Next, the RFID tag 100-112 stores a parent ID number equal to the own ID number of the group tag 100-11. Also, information associated with the RFID tag 100-112 indicates a "wallet" so that this wallet is one of Mr. Yamada's proprietaries not open to the public. Next, the RFID tag 100-121 stores a parent ID number equal to the own ID number of the group tag 100-12. Also, information associated with the RFID tag 100-121 indicates an "umbrella" so that this umbrella is one of Mr. Yamada's proprietaries which may be open to the public. Next, the RFID tag 100-122 stores a parent ID number equal to the own ID number of the group tag 100-12. Also, information associated with the RFID tag 100-122 indicates a "camera" so that this camera is one of Mr. Yamada's proprietaries which may be open to the public.

With the configuration described above, when one attempts to identify, for example, the product 900-111 (corresponding to the "wallet"), the group tag 100-1 is first identified, then the group tag 100-11 is identified using a tag ID read command which contains the tag ID of the group tag 100-1 in the parent ID number, the RFID tag 100-111 is next recognized using a tag ID read command which contains the tag ID of the group tag 100-11 in the parent ID number, and the product 900-1111 is identified from the tag ID of the RFID tag 100-111. This identification will fail unless the group tags 100-1, 100-11 are not located. Thus, if a certain group tag is left in a separate place or covered with a shielding plate such that it does not respond to radiowaves, no one can read information associated with an RFID tag which stores an parent ID number equal to the tag ID of that group tag. In the example of FIG. 9, when Mr. Yamada goes out, he may leave the group tag 100-11 indicative of "proprietaries not open to the public" in the house, and may carry the remaining group tags and the products to which the RFID tags are attached. In this way, Mr. Yamada can prevent others from reading, without permission, the tag ID's of RFID tags attached to products which Mr. Yamada wants not to be open to the public in places away from home.

It is further possible to set a parent ID number in the group tag 100-1, and store this parent ID number in the information storage unit 230 of the mobile terminal 200 owned by the user as the parent ID number 232. For example, ID numbers have been set as shown in FIG. 11. In FIG. 11, the parent ID number of the group tag 100-1 is set in the mobile terminal 200. Thus, it is only the mobile terminal 200 which knows the parent ID number of the group tag 100-1 that can read the own ID number of the group tag 100-1, and information associated with other group tags and RFID tags. In this way, even if one carries all products, to which the group tags and RFID tags are attached, when he goes out, a third party can be prevented from reading information associated with the RFID tags without permission.

While the foregoing embodiments have been described in connection with an RFID tag which stores one parent ID number, the RFID tag may store two or more different parent ID numbers within the scope of the present invention. When an RFID tag has two or more parent ID numbers, an associated product can belong to a plurality of sets, and the own ID number of the RFID tag can be acquired using a tag ID read command which contains any of the parent ID numbers stored in the RFID tag.

As described above, according to the present invention, a hierarchical structure is established among a plurality of RFID tags, so that one can read only ID numbers of RFID tags which belong to a particular layer. The RFID tag can control whether permission should be given to read its ID number to protect the ID number.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An RFID tag which holds data that can be read therefrom from outside over the air, said RFID tag comprising:
    a memory circuit for holding data; and
    a logic circuit for processing a control command received from outside over the air;
    wherein said memory circuit stores its own ID number for identifying said RFID tag itself, and stores one or more parent ID numbers for identifying at least one parent RFID tag, where said RFID tag and said at least one parent RFID tag are not the same tag; and
    when said RFID tag receives an ID number read command which contains first data as a parameter from outside, said logic circuit outputs the own ID number to outside over the air only when the first data matches a parent ID number of said one or more parent ID numbers stored in said RFID tag.

2. A mobile terminal capable of reading and writing data held by a child RFID tag over the air, comprising:
    an RFID tag communication unit for communicating with said child RFID tag over the air;
    an information storage unit for storing data and a control program;
    a radio communication unit having a function of communicating with a wide area communication network over the air; and
    an information processing unit for controlling said mobile terminal in accordance with the control program;
    wherein said child RFID tag stores a child ID number for identifying said child RFID tag itself, and stores one or more parent ID numbers for identifying at least one parent RFID tag, in a memory circuit, where said child RFID tag and said at least one parent RFID tag are not the same tag; and
    wherein said control program causes said RFID tag communication unit to transmit, to said child RFID tag, an ID number read command which contains one parent ID number of a known parent RFID tag of said at least one parent RFID tag as a parameter, and causes said RFID tag communication unit to receive, from said child RFID tag, the child ID number of said child RFID tag, as a response to the ID number read command.

3. The mobile terminal according to claim 2, wherein said control program disables said RFID tag communication unit to make a communication over the air while said radio communication unit is communicating with said wide area communication network over the air, and enables said RFID tag communication unit to make a communication over the air when said radio communication unit is not making a communication over the air.

4. An RFID tag system comprising a first RFID tag attached to a first product, a second RFID tag attached to a second product, and a mobile terminal for reading over the air data stored in said first RFID tag and said second RFID tag, wherein:
    said first RFID tag includes a memory circuit for holding a first own ID number for identifying said first RFID tag, and includes a first parent ID number for identifying a first parent RFID tag, where said first RFID tag and said first parent RFID tag are not the same tag;
    said second RFID tag includes a memory circuit for holding a second own ID number for identifying said second RFID tag, and includes a second parent ID number for identifying a second parent RFID tag, where said second RFID tag and said second parent RFID tag are not the same tag;
    when said first RFID tag receives an ID number read command from the outside, where said ID number read command contains first data of a parent ID number as a parameter, said first RFID tap outputs the first own ID number to outside over the air only when the parent ID number of the first data matches the first parent ID number held in said first RFID tag; and
    when said second RFID tag receives an ID number read command from outside, where said ID number read command contains second data of a parent ID as a parameter, said second RFID tag outputs the second own ID number to outside over the air only when the parent ID number of the second data matches the second parent ID number held in said second RFID tag.

5. The RFID tag system according to claim 4, wherein:
    said mobile terminal comprises an RFID tag communication unit for communicating with said first RFID tag and said second RFID tag over the air, an information storage unit for storing data and a control program, an radio communication unit for communicating with a wide area communication network over the air, and an information processing unit for controlling said mobile terminal in accordance with said control program;
    said first parent ID number has the same value as the second own ID number, and said second parent ID number has the same value as an ID number for identifying a third parent RFID tag; and
    said control program causes said RFID tag communication unit to transmit an ID number read command which contains the ID number of said third RFID tag as a parameter to acquire the ID number of said second RFID tag, and subsequently causes said RFID tag communication unit to transmit an ID number read command which contains the ID number of said second RFID tag as a parameter to acquire the ID number of said first RFID tag.

* * * * *